Sept. 18, 1934.  J. TELLER ET AL  1,974,222
GAS OR ELECTRIC RANGE
Filed Oct. 23, 1931  5 Sheets-Sheet 1
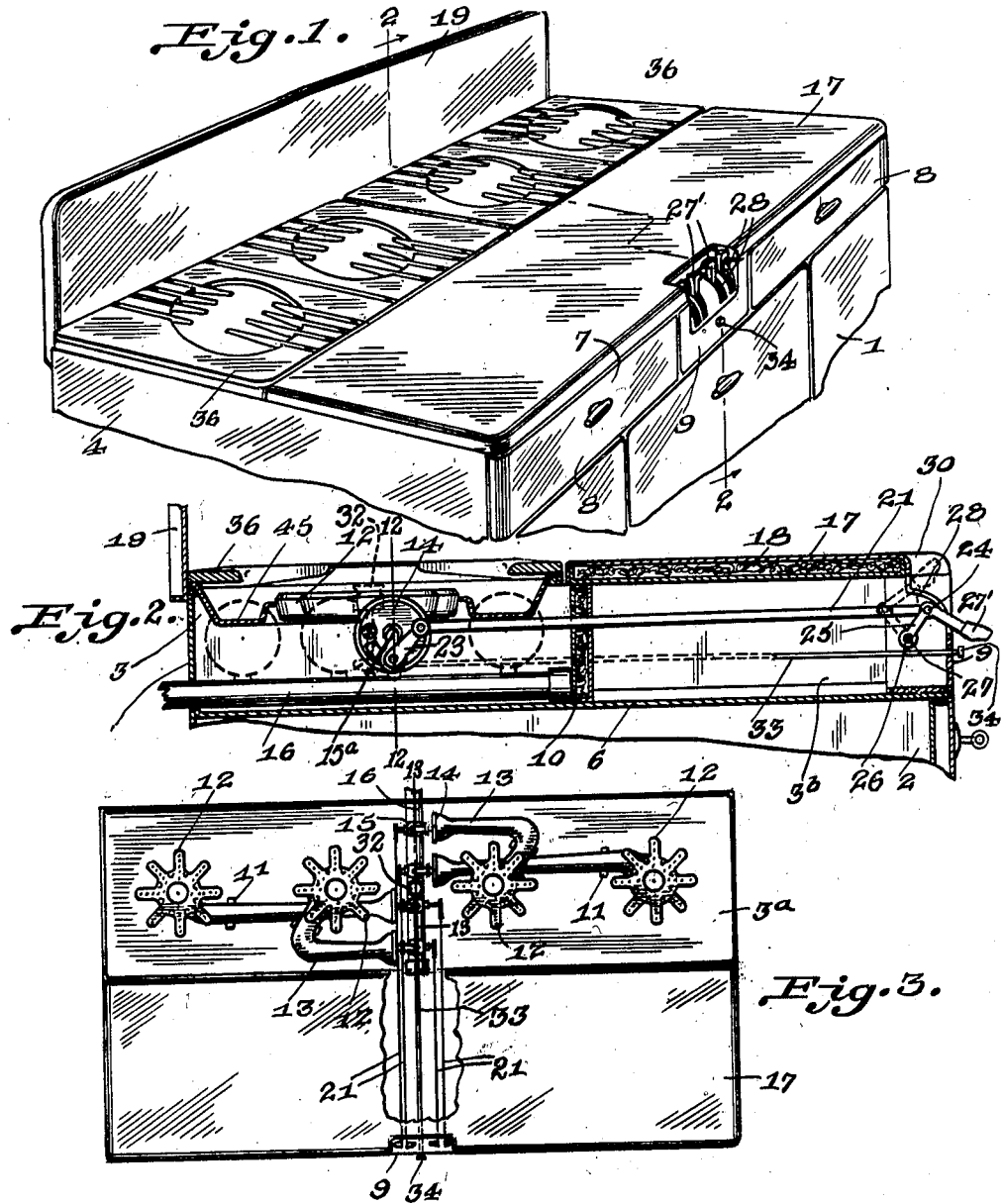
INVENTORS
Jacob Teller
AND Arthur P. Schulz
BY
ATTORNEY.

Sept. 18, 1934.  J. TELLER ET AL  1,974,222
GAS OR ELECTRIC RANGE
Filed Oct. 23, 1931  5 Sheets-Sheet 2
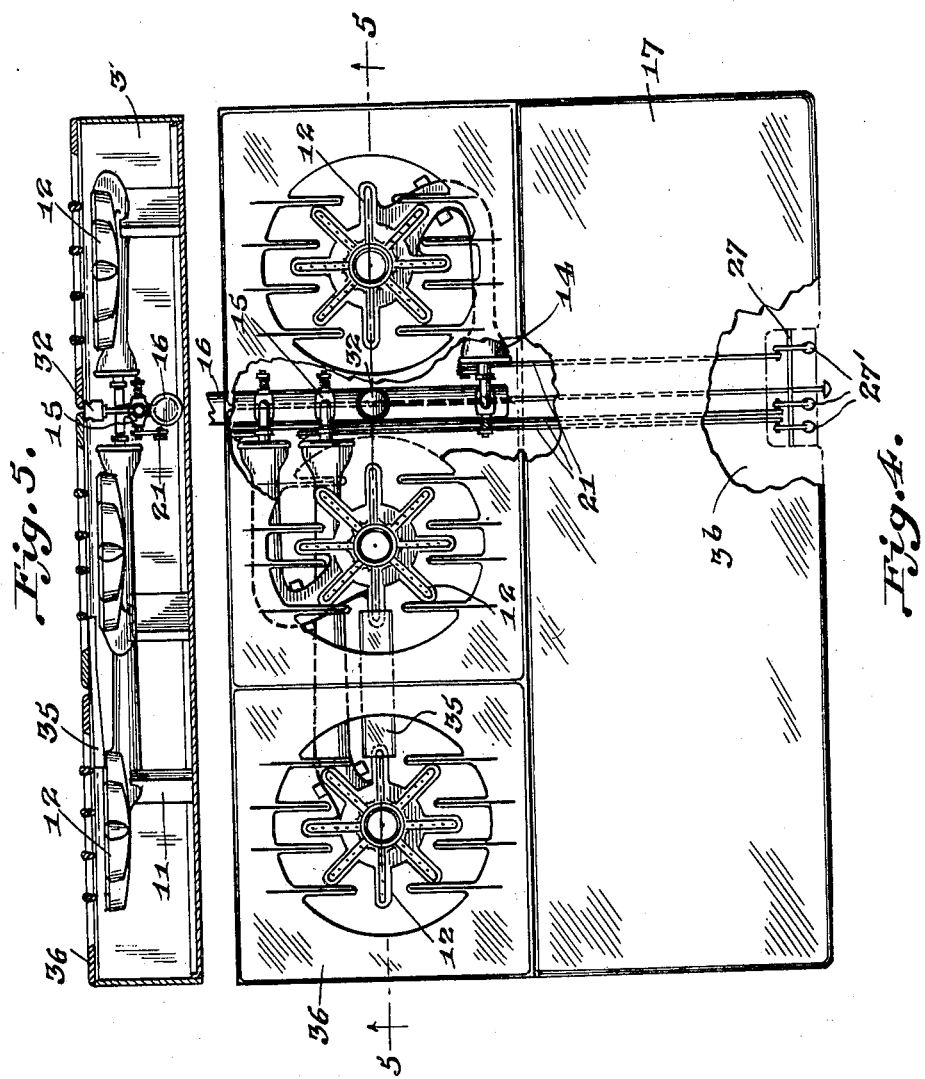
INVENTORS
Jacob Teller
AND Arthur P. Schulz
BY
ATTORNEY.

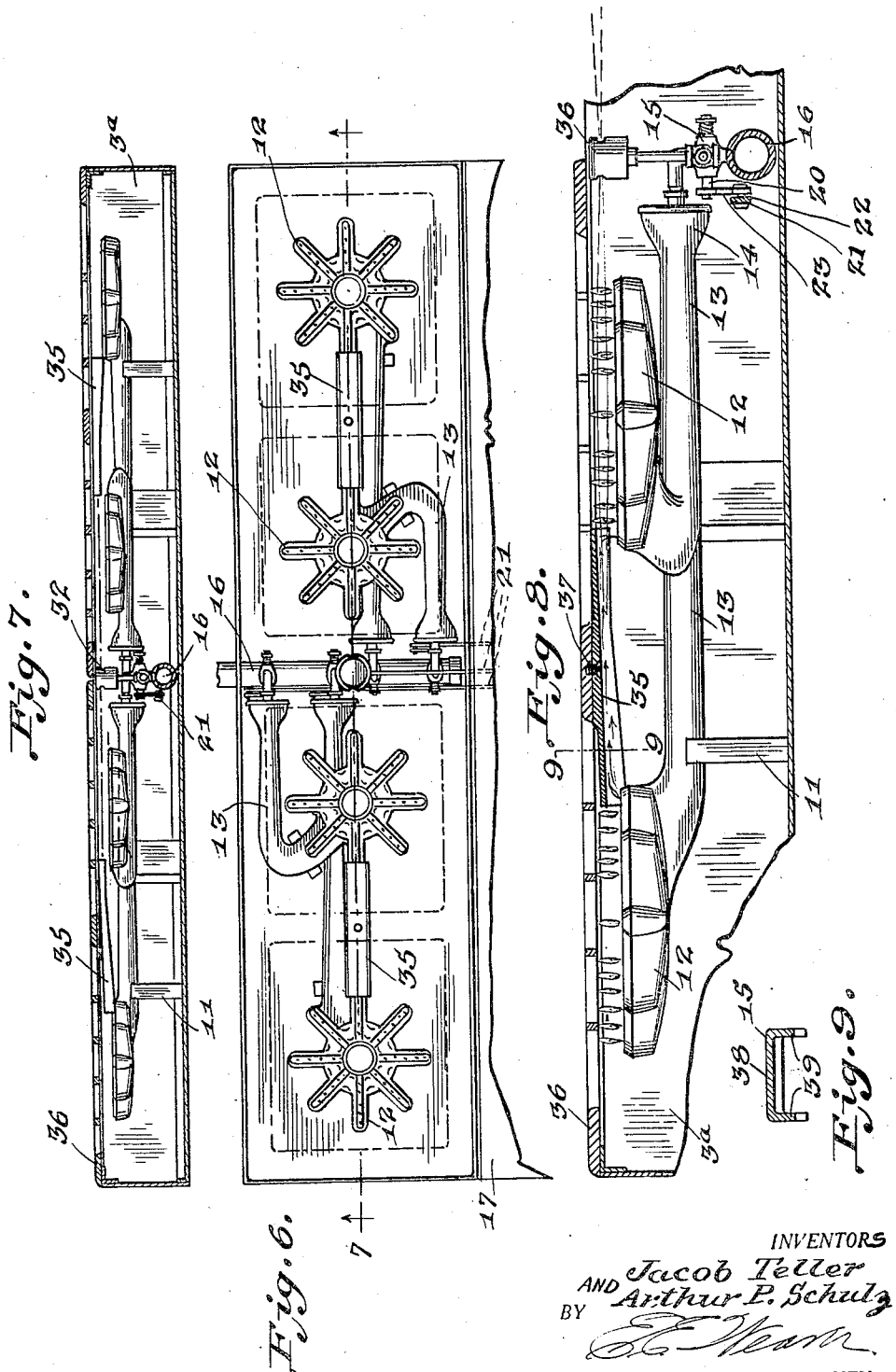

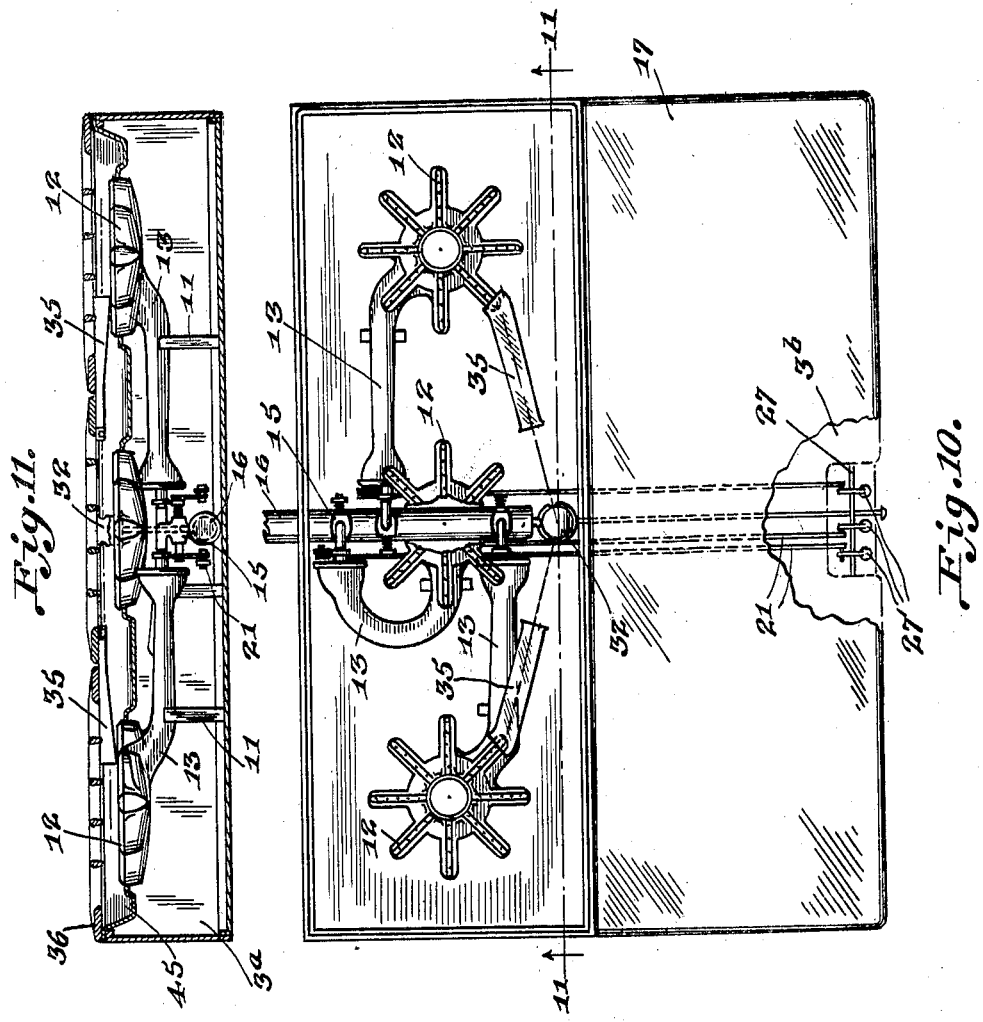

Sept. 18, 1934. J. TELLER ET AL 1,974,222
GAS OR ELECTRIC RANGE
Filed Oct. 23, 1931 5 Sheets-Sheet 5
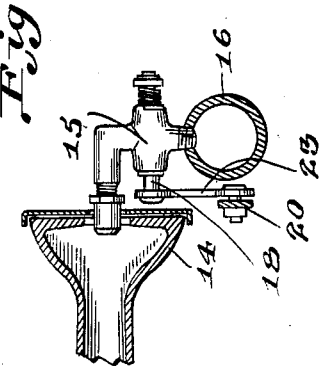
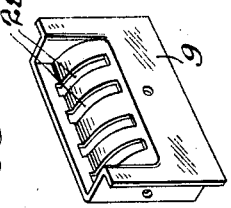
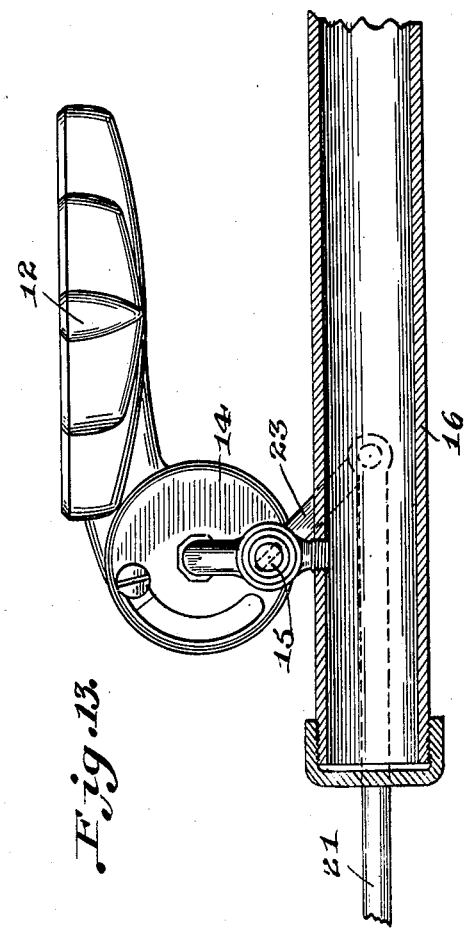
INVENTORS
Jacob Teller
AND Arthur P. Schulz
BY
ATTORNEY.

Patented Sept. 18, 1934

1,974,222

UNITED STATES PATENT OFFICE 1,974,222

GAS OR ELECTRIC RANGE

Jacob Teller, New Rochelle, and Arthur P. Schulz, New York, N. Y., assignors, by mesne assignments, to Teller Stove Designing Corporation, a corporation of New York Application October 23, 1931, Serial No. 570,675

2 Claims. (Cl. 126—39)

This invention relates to cooking apparatus and embraces among its numerous features and objects, that of providing a cooking top with burners arranged in a straight line, preferably toward the rear of said top; the provision of means whereby the controls may be grouped within a space of small compass; the structural arrangement wherein the controls are disposed remotely from the burners and therefore unaffected by the heat therefrom; in the provision of a construction wherein there is combined with the rear straight line arrangement of burners, a forward working table top from or to which cooking vessels may be moved at will with respect to the burners, and in the arrangement whereby the working top may be kept in relatively cool condition during the operation of the stove. These and other advantages will be apparent to those familiar with the art.

In the accompanying drawings:

Fig. 1 is a top perspective view of a cooking range embodying our invention;

Fig. 2 is a transverse section substantially on the line 2—2 of Fig. 1;

Fig. 3 is a top plan view of the range shown in Fig. 1 with the burner grids removed;

Fig. 4 is a top plan view of a slightly modified form of the invention;

Fig. 5 is a longitudinal section taken substantially on the line 5—5 of Figure 4;

Figure 6 is a top plan view of the arrangement shown in Figs. 1, 2 and 3, showing the application of our novel form of lighter;

Figure 7 is a longitudinal section taken on substantially the line 7—7 of Fig. 6;

Figure 8 is a similar view of one end of the burner top, with the parts enlarged and in section, to show the detail of the lighter arrangement;

Figure 9 is a detail cross-sectional view of the lighter means, substantially on the line 9—9 of Figure 8;

Figure 10 is a top plan view of a further modified form of our invention, with portions broken away for the sake of illustration;

Figure 11 is a longitudinal sectional view, substantially on the line 11—11 of Figure 10;

Figure 12 is a sectional view through the manifold and mixer on substantially the line 12—12 of Figure 2;

Figure 13 is an enlarged detail view taken substantially on the line 13—13 of Figure 3, the burner and mixer being shown in side elevation;

Figure 14 is a detail view of the control panel.

Referring now more particularly to the drawings by numerals of reference, and at present to Figure 1, 1 indicates the body of a gas or electric cooking apparatus having the usual oven and broiler compartments 2, and an upper compartment 3 which houses the burners and their associated fuel supply and control mechanism. The compartment 3 includes side walls 4, a rear wall 5, a bottom plate 6, usually of insulated material, and a front panel 7, the latter being formed. if desired, in sections to provide drawers or doors 8, affording access to the space within the forward portion of the compartment 3.

The central portion of the panel 7 may be formed of a separate and removable unit 9, constituting the control panel for the burners and the lighter.

The compartment 3 may be divided into forward and rear sub-compartments 3a and 3b by a longitudinal, substantially centrally located insulating partition 10, more specifically described in our copending application, filed October 23, 1931, Serial Number 570,673, patented January 2, 1934, No. 1,942,265.

In the rear sub-compartment 3a are mounted on suitable brackets 11, a plurality of burners 12, arranged in a straight line longitudinally of said compartment, and each of said burners having a gas supply arm 13, which extends toward a substantially transverse central median line of the cooking top, each of said gas arms terminating in the usual mixer 14, in turn, through the gas valve 15, connected with a gas-supply manifold 16, arranged transversely of the cooking top within the compartment 3 on said substantially central median line.

The forward sub-compartment 3b, which parallels the rear sub-compartment is covered by a plate 17, formed preferably of two spaced metallic sheets with an insulating filling 18 of asbestos or other suitable material. This plate 17 serves as a working top convenient to the burner top portion, and in general, is similar to that embodied in my said copending application. It will therefor be noted that the arrangement provides a cool working top and also means whereby the burner controls are remote from the burners, and therefore, always in a cool condition. The cooking top is also provided at its rear with the usual back plate or guard 19, as in our copending application.

Since one of the predominating features of the present invention resides in what we term a group-control of the burners, in addition to the straight line feature, it is necessary to resort to the particular arrangement herein shown whereby a plurality of separated burners may be controlled and operated from a substantially single point or space on the cooking top, as distinguished from the usual control means in which the valve handles are arranged in spaced relation throughout the length of the cooking top.

To this end, the valves 15 are arranged in a straight line, from front to rear of the sub-compartment 3a on the manifold 16, with the valve stems 20 of the two rear valves extending transversely of the manifold in one direction, while the stems of the two front valves extend in the opposite direction, as clearly shown in Figure 3. Further, the rear valve stems of each of the front and rear sets of valves are preferably slightly longer than the front stems, for sake of clearance of valve operating rods 21, the rear end of each of which is pivotally connected at 22 with the extremity of an arm 23 fixed to the valve stem. The forward end of each valve operating rod 21 is pivotally connected at 24 with an angularly formed lever 25, the lower end of which is pivoted as at 26 on a pin 27, preferably carried by or mounted in the end walls of the intermediate panel member 9, the handle 27' for each lever 25 extending through and operating within a slot 28 formed in the front wall of the panel.

As shown in Figure 2, the arm 23 on the valve stem extends upwardly, while in Figures 12 and 13, said arm extends downwardly. This arrangement is found convenient where the operating rods form the rear seat of valves upon one side of the control manifold need to clear the nozzles 15a of the valves forward of them. Therefore, the arms 23 of the two valves 15, on the left of the manifold at the rear, would extend upwardly so the operating rods would have the proper clearance with respect to said forward valve nozzles, (see Figs. 4 and 5). Of course, this arrangement is made for sake of convenience of construction and operation, but other ways and means of arriving at the same results might well be found just as efficient and operative, and therefore, we do not wish to limit ourselves to the specific construction shown.

As will be observed upon reference to Figures 1 and 2, the front wall of the center panel 9, is upwardly and rearwardly curved, so as to provide a recess 30 (see Fig. 17) in the front of the working top 17 into which the handles 27 of the valves 15 will be moved and be disposed when the handles are moved to close the flow of gas to the burners. When so disposed, they will form no obstruction nor extension beyond the front or upper surface of the working top, which might catch onto the clothing of an operator or person passing the range, to cause accidental turning on of the valves. On the other hand, when a valve is open, its controlling handle will extend forwardly of the front of the panel 9, thus giving a visual indication of this fact. The safety features of this arrangement will therefore be quite evident, and will appeal to the person using the range, or to others familiar with this art.

A pilot light 32 on the manifold, is controlled by a push rod 33, the forward end of which extends through the panel 9, and terminates in the push-button 34. In such arrangements as we have shown in Figures 1 to 11, wherein the burners are arranged on a straight line, it is necessary to provide a pilot lighting means wherein those burners remote from the main pilot light 32 will be ignited when necessary.

To this end, I provide a construction more clearly shown in Figures 7, 8 and 9, said construction embodying an inverted U or channel member 35, secured to the under side of a burner grid member 36 by a screw or bolt 37, said channel member including a web 38 and lateral parallel depending flanges 39. The arrangement is such that, as shown clearly in Figure 8, when it is desired to light the burner 12 at the extreme left, of Fig. 8, or extreme left or right of Figs. 6 and 7, and which burner is remote from the main pilot light 32, and assuming that the adjacent burner 12 is lighted, all that is necessary, is to turn on the valve which supplies gas to the said burner at the extreme left or right, and a part of the gas therefrom will flow into the channel 35 and becoming ignited will produce a path of flame therein, resulting in ignition of the gas at the remote burner.

In Figures 4 and 5, which show a three burner straight line cooking top, the construction is identical with that of Figures 1, 2 and 3, except for the fact that in this arrangement, two burners are arranged upon one side of the manifold, while a single burner is disposed upon the opposite side, it being understood that the lighter arrangement shown in detail is employed in the construction of Figures 1, 2 and 3, although not shown in the latter views for the sake of clearness.

In Figs. 10 and 11, I have shown another form of three burner straight line cooking top, in which the centrally located manifold 16 is disposed beneath the middle burner, as distinguished from the form shown in Figures 4 and 5, in which latter, the manifold is arranged between the second and third burner. Otherwise, the construction is the same as predominates through Figures 1 to 13. In Figures 10 and 11, I have shown a slightly different arrangement of the lighter channel members whereby the two end burners are ignited from the main pilot light, through the gas conducting channels 35, which are the same in construction and operation as those shown in Figure 8.

What we claim as new and desire to protect by Letters Patent is:—

1. In a cooking apparatus, an upper compartment having a rear gas burner containing portion, and a forward portion having a working top, a manifold extending transversely of said compartment, valves on said manifold, burners within said rear portion of said compartment connected with said valves upon opposite sides of said manifold, operating means connected with said valves and extending forwardly of said compartment below said working top and control devices on the front of said stove connected with said valve operating means and control devices.

2. In a cooking apparatus, an upper compartment having a rear gas burner containing portion, and a forward portion having a working top, a manifold in said compartment, valves on said manifold, burners within said rear portion of said compartment connected with said valves, operating means connected with said valves and extending forwardly of said compartment below said working top, and control devices at the front of said stove connected with said valve operating means and control devices.

JACOB TELLER.
ARTHUR P. SCHULZ.